(12) United States Patent
Turaish et al.

(10) Patent No.: US 12,124,451 B2
(45) Date of Patent: Oct. 22, 2024

(54) SYSTEM AND METHOD FOR EFFICIENT INTEGRATION WITH A PRIMARY DATABASE TO REDUCE UNNECESSARY NETWORK TRAFFIC

(71) Applicant: Saudi Arabian Oil Company, Dhahran (SA)

(72) Inventors: Hani M Turaish, Al Qatif (SA); Nabeel H Althagafi, Khobar (SA)

(73) Assignee: Saudi Arabian Oil Company, Dhahran (SA)

(*) Notice: Subject to any disclaimer, the term of this patent is extended or adjusted under 35 U.S.C. 154(b) by 0 days.

(21) Appl. No.: 18/186,600

(22) Filed: Mar. 20, 2023

(65) Prior Publication Data

US 2024/0320219 A1    Sep. 26, 2024

(51) Int. Cl.
　　G06F 16/245　　(2019.01)
　　G06F 16/2453　　(2019.01)
　　G06F 16/2455　　(2019.01)

(52) U.S. Cl.
　　CPC .. *G06F 16/24545* (2019.01); *G06F 16/24539* (2019.01); *G06F 16/24568* (2019.01)

(58) Field of Classification Search
　　None
　　See application file for complete search history.

(56) References Cited

U.S. PATENT DOCUMENTS

| | | |
|---|---|---|
| 6,615,253 B1 | 9/2003 | Bowman-Amuah |
| 6,754,672 B1 | 6/2004 | McLauchlin |
| 7,194,426 B1 | 3/2007 | Box |
| 2004/0015504 A1* | 1/2004 | Ahad ............... G06F 16/24552 |
| 2008/0082510 A1* | 4/2008 | Wang .................... G06F 16/683 |
| 2009/0198675 A1* | 8/2009 | Mihalik ............... G06F 16/248 |
| | | 707/999.005 |
| 2013/0047070 A1* | 2/2013 | Lee ........................ G06F 16/93 |
| 2014/0344391 A1 | 11/2014 | Varney et al. |
| 2019/0065775 A1* | 2/2019 | Klucar, Jr. ......... G06F 16/24552 |
| 2023/0089710 A1* | 3/2023 | Schoenheider ....... G06F 16/172 |
| | | 707/770 |

FOREIGN PATENT DOCUMENTS

WO　　WO 0180092　　10/2001

* cited by examiner

*Primary Examiner* — Son T Hoang
(74) *Attorney, Agent, or Firm* — Fish & Richardson P.C.

(57) ABSTRACT

A computer-implemented method that includes: receiving, at a middleware server, an input stream of query requests each requesting an electronic information service provided by an external database of an external trusted party, wherein the query requests are issued by internal enterprise applications; determining, by the middleware server, a first service validity period for a query request from the input stream, wherein the first service validity period is pre-determined; determining, by the middleware server, a gap between a current date for the query request and a corresponding past date when the query request was last successfully answered by the external database; and in response to determining that the gap is smaller than the first service validity period, fetching a corresponding query result from a staging table on the middleware server, wherein the corresponding query result was received when the query request was last successfully answered by the external database.

14 Claims, 4 Drawing Sheets

SYSTEM AND METHOD FOR EFFICIENT INTEGRATION WITH A PRIMARY DATABASE TO REDUCE UNNECESSARY NETWORK TRAFFIC

TECHNICAL FIELD

This disclosure generally relates to database integration and data verification.

BACKGROUND

A large scale and distributed database can span across various organizational entities and involve multiple nodes and servers. Large-scale and distributed database management systems (DBMS) are designed to handle vast amounts of data across multiple servers or nodes, enabling fast access and retrieval of data for applications with high volumes of transactions. These systems are used in a wide range of industries, including finance, education, healthcare, e-commerce, e-government, and social media.

SUMMARY

In one aspect, implementations provide a computer-implemented method comprising: receiving, at a middleware server, an input stream of query requests each requesting an electronic information service provided by an external database of an external trusted party, wherein the query requests are issued by internal enterprise applications; determining, by the middleware server, a first service validity period for a query request from the input stream, wherein the first service validity period is pre-determined; determining, by the middleware server, a gap between a current date for the query request and a corresponding past date when the query request was last successfully answered by the external database; and in response to determining that the gap is smaller than the first service validity period, fetching a corresponding query result from a staging table on the middleware server, wherein the corresponding query result was received when the query request was last successfully answered by the external database.

Implementations may include one or more of the following features.

The implementations may further include: establishing a service call log table that logs service calls made to the external database of the trusted party, a mapping table that records a validity period for each combination of an enterprise application and an electronic information service provided by the external database of the trusted party, and the staging table that stores, for each electronic information service, a corresponding query result retrieved from the external database of the trusted party. The implementations may further include: in response to determining that the gap is not smaller than the first service validity period, invoking a cost control logic that determines a second service validity period, wherein the second service validity period customized for each specific query request in the input stream. The implementations may further include: in response to the gap being smaller than the second service validity period, continuing to rely on the corresponding query result from the staging table on the middleware server. The implementations may further include: in response to the gap being no smaller than the second service validity period, initiating a call to the external database so that the corresponding query result is fetched from the external database. The implementations may further include: creating a new entry in the service call log table; and storing a copy of the corresponding query result into the staging table at the middleware server.

The external database of the trusted party may provide a web service. The middleware server may interact with the web service for accessing the external database. The trusted party may be a government branch.

In another aspect, implementations provide a middleware server comprising one or more hardware computer processors configured to perform operations of: receiving an input stream of query requests each requesting an electronic information service provided by an external database of an external trusted party, wherein the query requests are issued by internal enterprise applications; determining a first service validity period for a query request from the input stream, wherein the first service validity period is pre-determined; determining a gap between a current date for the query request and a corresponding past date when the query request was last successfully answered by the external database; and in response to determining that the gap is smaller than the first service validity period, fetching a corresponding query result from a staging table on the middleware server, wherein the corresponding query result was received when the query request was last successfully answered by the external database.

Implementations may include one or more of the following features.

The operations may further include: establishing a service call log table that logs service calls made to the external database of the trusted party, a mapping table that records a validity period for each combination of an enterprise application and an electronic information service provided by the external database of the trusted party, and the staging table that stores, for each electronic information service, a corresponding query result retrieved from the external database of the trusted party. The operations may further include: in response to determining that the gap is not smaller than the first service validity period, invoking a cost control logic that determines a second service validity period, wherein the second service validity period customized for each specific query request in the input stream. The operations may further include: in response to the gap being smaller than the second service validity period, continuing to rely on the corresponding query result from the staging table on the middleware server. The operations may further include: in response to the gap being no smaller than the second service validity period, initiating a call to the external database so that the corresponding query result is fetched from the external database. The operations mat further include: creating a new entry in the service call log table; and storing a copy of the corresponding query result into the staging table at the middleware server. The external database of the trusted party may provide a web service. The middleware server may interact with the web service for accessing the external database. The trusted party may a government branch.

In yet another aspect, implementations provide a non-transitory computer-readable medium comprising software instructions that, when executed, cause a computer processor to perform operations of: receiving an input stream of query requests each requesting an electronic information service provided by an external database of an external trusted party, wherein the query requests are issued by internal enterprise applications; determining a first service validity period for a query request from the input stream, wherein the first service validity period is pre-determined; determining a gap between a current date for the query request and a corresponding past date when the query request was last successfully answered by the external database; and in response to determining that the gap is smaller than the first service validity period, fetching a corresponding query result from a staging table on a middleware server that includes the computer processor, wherein the corresponding query result was received when the query request was last successfully answered by the external database.

Implementations may provide one or more of the following features.

The operations may further include: establishing a service call log table that logs service calls made to the external database of the trusted party, a mapping table that records a validity period for each combination of an enterprise application and an electronic information service provided by the external database of the trusted party, and the staging table that stores, for each electronic information service, a corresponding query result retrieved from the external database of the trusted party. The operations may further include: in response to determining that the gap is not smaller than the first service validity period, invoking a cost control logic that determines a second service validity period, wherein the second service validity period customized for each specific query request in the input stream. The operations may further include: in response to the gap being smaller than the second service validity period, continuing to rely on the corresponding query result from the staging table on the middleware server. The operations may further include: in response to the gap being no smaller than the second service validity period, initiating a call to the external database so that the corresponding query result is fetched from the external database. The operations mat further include: creating a new entry in the service call log table; and storing a copy of the corresponding query result into the staging table at the middleware server.

Implementations according to the present disclosure may be realized in computer implemented methods, hardware computing systems, and tangible computer readable media. For example, a system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The details of one or more implementations of the subject matter of this specification are set forth in the description, the claims, and the accompanying drawings. Other features, aspects, and advantages of the subject matter will become apparent from the description, the claims, and the accompanying drawings.

DESCRIPTION OF DRAWINGS

Like reference numbers and designations in the various drawings indicate like elements.

DETAILED DESCRIPTION

The disclosed technology is directed to system and method for integrating with e-services provided by a trusted party (e.g., e-government services, external library services) and the concomitant data synchronization. The integration provides synchronized and up to date database information in accordance with information from the trusted party in a manner that enforces policy compliance and streamlines data verification. The integrated system can incorporate a unique cost control mechanism that dynamically defines the data validity period based on the need of each application. The same service can have different validity period based on the application that patronizes the service. Such adaptive customization can reduce the service cost and significantly reduce unnecessary network traffic.

Some implementations may integrate enterprise applications with trusted party services (e.g., e-government services) provided by third party vendor. In general, the integration can be provided at a cost calculated per number of initiated transactions. A cost control mechanism can be built in the implementations to minimize unnecessary cost and reduce HTTP traffic volume without compromising the data credibility. In these implementations, the cost control has been built around the realities that not all business application may require the data in real-time and some data do not frequently change (e.g., name and birthdate), or changes slowly (e.g., wait-time per regulations that may evolve slowly) while some application may require the data to be retrieved in real time (e.g. dependent information in case of validating new born information). Based on these realities, a dynamic cost control has been built to cater for all application scenarios. The dynamic cost control is customizable for each use case scenario with unique rules for each combination of internal enterprise application and external trusted party service combination. The customization can be achieved by storing the data from a database of the trusted party in staging tables and defining a validity period for the stored data. In the implementations, the validity of the data is varied per each use case (e.g. one application might require the validity period to be one month but other might require it to be only valid for one week for the same service). FIGS. 1-4 describe more details of the implementations.

Figure 1:
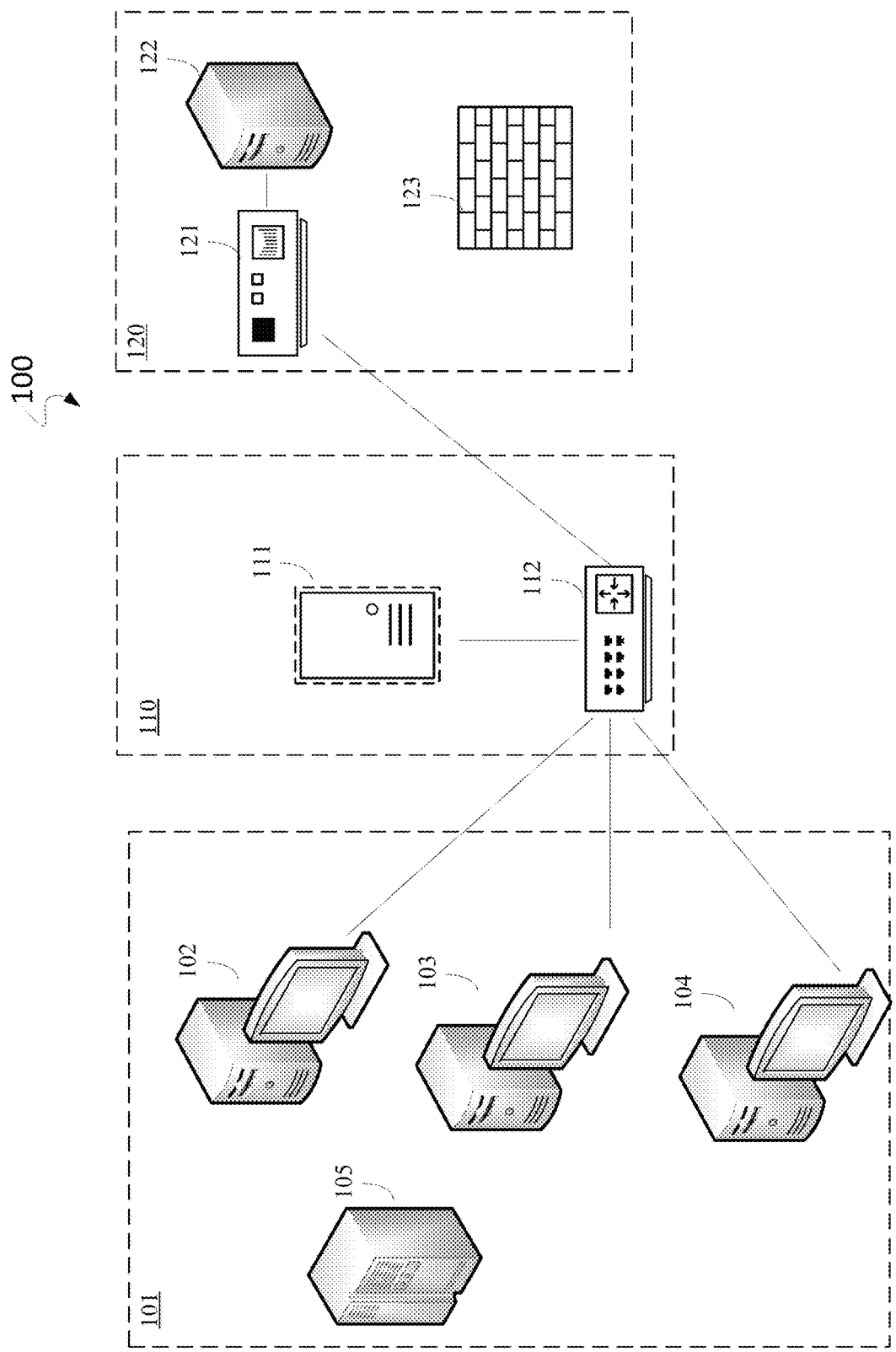
FIG. 1 is a diagram illustrating an example according to some implementations of the present disclosure.

As illustrated in diagram 100 of FIG. 1, implementations may integrate enterprise applications 102 with external services from a trusted party 120 (e.g., e-Government services) via integration framework 110. In some implementations, the integration framework 110 can include a middleware server. Enterprise applications can include business application 102, business application 103, and business application 104, each of which can be set up to serve a particular application scenario (e.g., regional services, split-time services, department/group services). Each application may have a set of rules for data governance and validity duration. Enterprise application 101 may also operate from server 105 to access business applications 102-104. A user on a user computing device can access business applications 102-104 directly, or access server 105 to indirectly access business applications 102-104.

External services at trusted party 120 can be offered via web services 121 hosted by secure server 122. The web services 121 may utilize hypertext transfer protocol (HTTP)

and leverage high-speed network to serve a large number of requests, regardless of subscription status of the requester. Examples of external services at a trust party include e-Government services. To guard against malicious attacks (e.g., denial of service attacks), external services can be coupled to a firewall 123.

Integration framework 110 may bridge enterprise applications 102 with external services from a trusted party 120. As illustrated, integration framework 110 may include cost control logic 112 hosting staging table 111. In response to incoming request from each business application (e.g., business applications 102-104), cost control logic 112 determines, based on staging table 111, whether data stored locally is valid for the purpose of replying to the incoming request. Integration framework thus amounts to a database management system that bridges enterprise application 101 and external services at a trusted party 120 (i.e., large databases with data that potentially change, albeit slowly). These databases can be distributed and heterogeneous databases.

Figure 2:
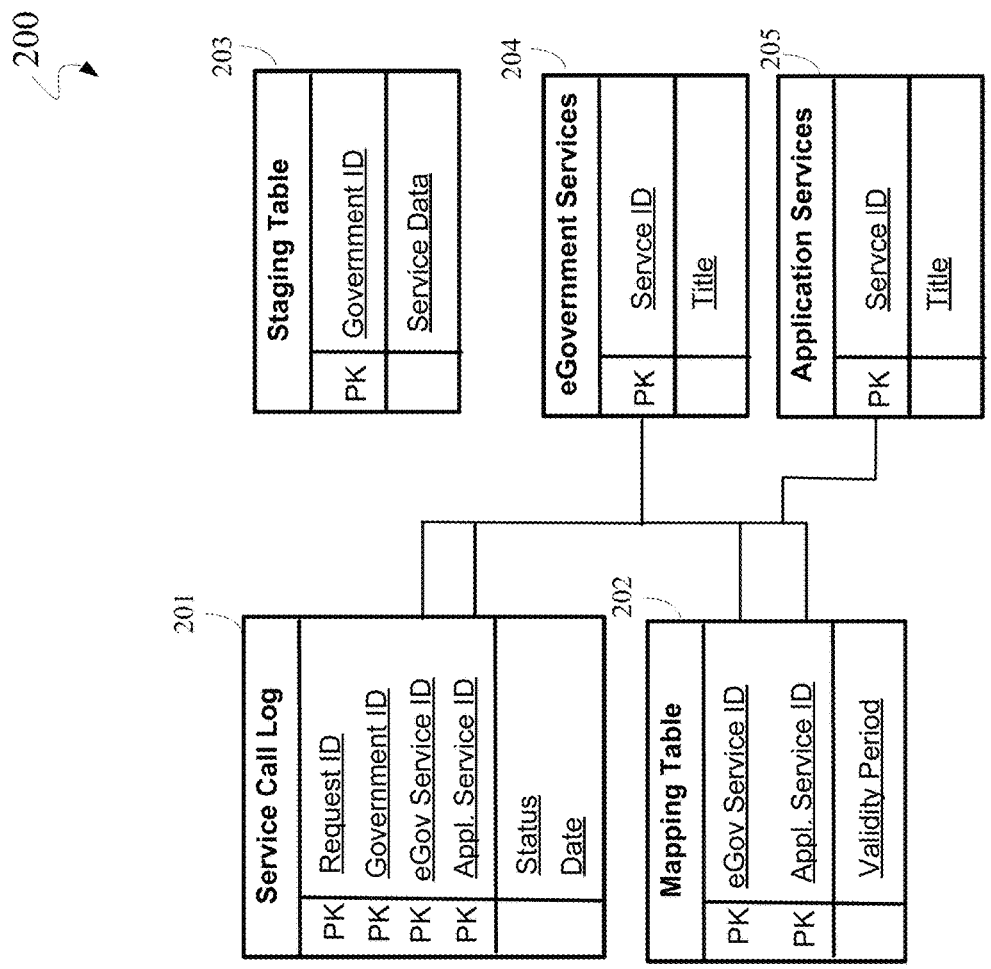
FIG. 2 illustrates examples of tables used in some implementations of the present disclosure.

Referring to FIG. 2, diagram 200 shows examples of tables used by integration framework 110. As illustrated, table 201 shows an example of a service call log that includes Request ID, Government ID, eGov Service ID, and Appl. Service ID as primary keys (PKs). Each log entry also includes status and date. Table 202 shows an example of a mapping table that includes eGov. Service ID and Appl. Service ID as primary keys (PKs). Each table entry includes a validity period. Table 203 shows an example of a staging table that includes Government ID as a primary key (PK). Each table entry include the service data (e.g., data content). Table 204 shows an example of e-Government services that includes service ID as a primary key (PK). Each entry includes a title of the service. Table 205 shows an example of application services that includes service ID as a primary key (PK). Each entry includes a title. As illustrated, a unique identifier is assigned to each application and e-government service where a validity period is been assigned for each combination of application and e-government services. For each service call, a new log entry can be created per table 201 and the retrieved data can be stored in a corresponding staging table 203.

In addition to a base-line cost control according to a validity period that is applicable for all the scenarios, implementations of the present disclosure can define a custom cost control for additional check that only applicable for specific scenario (e.g., each combination of application and e-government services). An example of custom cost control for service pertains to a specific scenario in which the service retrieves the employee's travel history (entry and exist dates from country) and calculates the number of days the employee has been out of country. This example can use the following logic when processing a service request for the maximum days allowed out of country from e-government travel history service. In this example, a baseline maximum limit can be a constant value (e.g., pre-determined) for the maximum days out of country. The last synch date can determined by getting the last synch date from the staging table (e.g., table 203). The last calculated days refers to the calculation based on the current available data on the staging table from the last data retrieval. The travel history in the staging table refer to the employee's travel history data already exist in the staging table that has been previously fetched from the e-Government service. Based on the information above, the maximal possible days can be calculated as (Current Date−Last Synch Date)+Last Calculated Days. This maximal possible days thus refer to the maximum possible calculation based on the assumption the employee has been out of country since the last retrieval date. This calculation includes the number of days between current execution date and the last retrieval date and added to the previously calculated out of country days based on the last retrieval data. In this example, control logic 112 of the integration framework 110 only initiates a new web service call (to web service 121) when maximal possible days is larger than the maximum limit. The above cost control logic can allow the application to initiate a new service call only when there is a possibility of exceeding the maximum limit. The integration framework thus assume that the unknown period from the last retrieved travel history data until the current date is out of country and calculate the out of country days based on that assumption. If the calculated value exceed the maximum limit, the control logic will initiate a new call to refresh the staging table data and recalculate with the actual travel history data.

Figure 3:
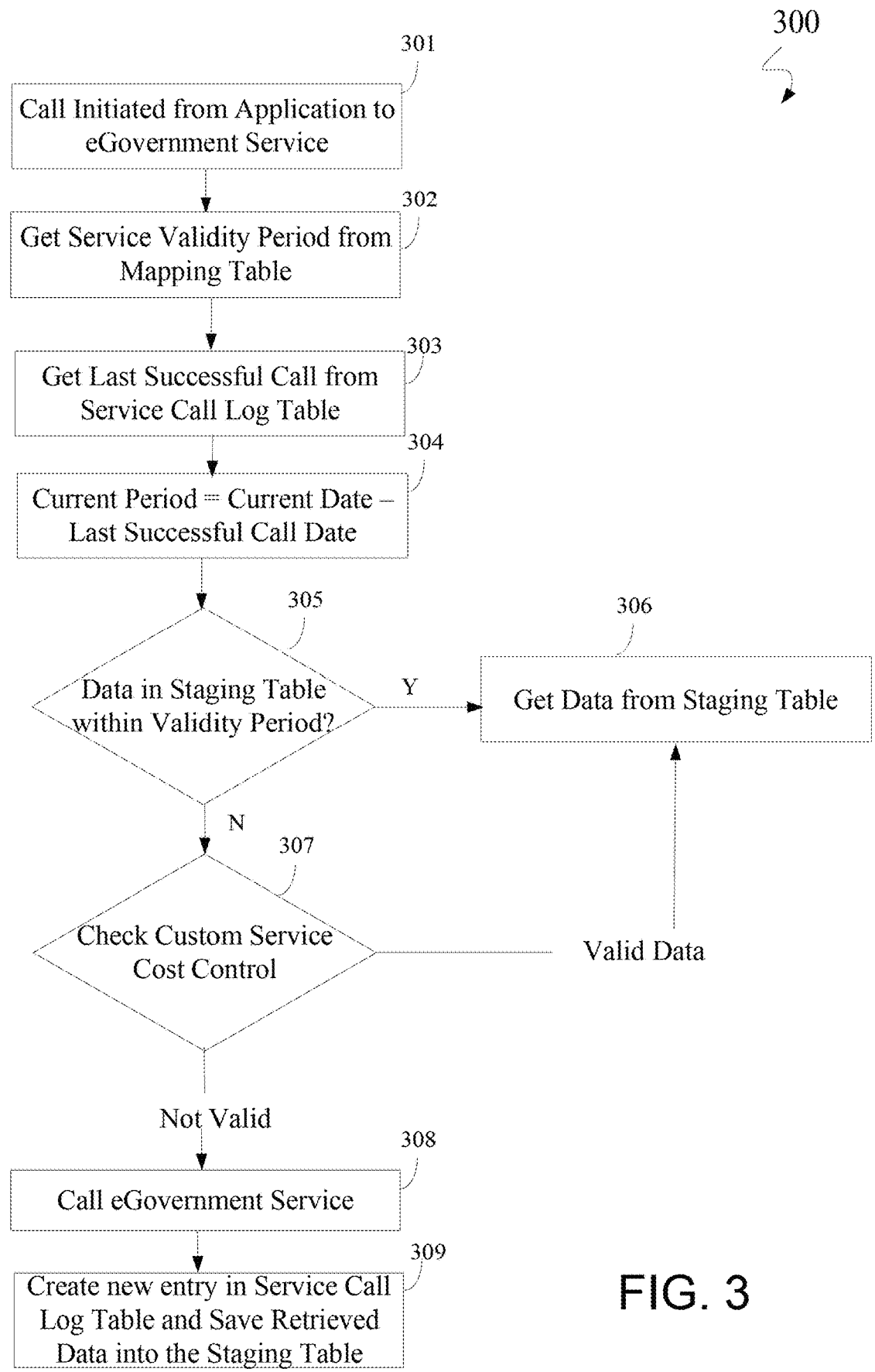
FIG. 3 is a flow chart illustrating an example according to some implementations of the present disclosure.

FIG. 3 is a flow chart 300 illustrating an example of a process according to some implementations of the present disclosure. The process may initiate a service call from an application to a service of a trusted party (301). In some cases, the trusted party service can include an e-Government service. The application be include an enterprise application that needs to access data from the trusted party. The process may then retrieve the service validity period from a mapping table (302). An example of the mapping table 202 is shown in FIG. 2. The process may then access the record of the last successful call from the service call log table (303). An example of the service call log 201 can be found in FIG. 2. The process may then calculate current period as the gap between current date and last successful call date (304). Based on the calculation, the process may then determine whether data in staging table (e.g., table 203) is within a validity period (305). In response to determining that the data in staging table is within the validity period, the process may proceed to get data from staging table (306). In response to determining that the data in staging table is not within the validity period, the process may then proceed to invoke a service cost control logic customized for the application (307). In response to the service cost control logic determining the data is valid, the process may proceed to get the data from the staging table (306). In response to the service cost logic determining the data in staging table is no long valid, the process may proceed to place a web service call with the trusted party (308). In response to receiving a reply from the service hosted by the trusted party, the process may create a new entry in the service call log table and store the received data into the staging table (309). This example is generally applicable to various enterprises that utilize an external service provided by a trusted party (e.g., e-Government service) for integration of large data validation. The integration may involve a contract that imposes a charge per transaction call. Moreover, the dynamic cost control mechanism can be expanded further outside the e-government integration in application where data synchronization may be needed with dynamic data validity period based on varying need to reduce the cost and minimize web traffic (e.g., transactional request placed) without comprising data credibility. The implementations are not limited to external information services provided by a government branch. For example, the implementations can integrate a middleware server within the enterprise with information services provided by an external library, or an external professional organization.

The following tables show statistic for one integration scenario that has been implemented to monitor queries for out of country days from e-government travel history service if exceeded certain limit. The study was conducted with 100 days limit and the numbers are rounded to the nearest 100.

Table 1 shows the summary statistics for years 2017 to 2019, indicating a savings of 21-32%.

TABLE 1

| Year | Number of run | Population | Expected number of call without cost control | Actual number of call | Reduction % |
|---|---|---|---|---|---|
| 2017 | 5 | 4900 | 24500 | 19000 | 22% |
| 2018 | 5 | 4700 | 23500 | 18500 | 21% |
| 2019 | 6 | 4700 | 28200 | 19100 | 32% |

Table 2 shows the breakdown of the yearly statistics into each month (e.g., from May to December).

TABLE 2

| Year | Month | Number of Call |
|---|---|---|
| 2017 | May | 4900 |
|  | July | 1900 |
|  | September | 4600 |
|  | November | 3600 |
|  | December | 4000 |
| 2018 | May | 4700 |
|  | July | 1700 |
|  | September | 4200 |
|  | November | 4100 |
|  | December | 3800 |
| 2019 | May | 4700 |
|  | July | 1700 |
|  | September | 4700 |
|  | October | 2600 |
|  | November | 1200 |
|  | December | 4200 |

While the statistics reveal a saving around 20-30% with a limited 5-6 number of call per year, the saving percentage is expected to be much higher if the control logic is applied in larger scale. For the above example, the travel history service cost 10 SAR per transaction and the actual saving between 2017 to 2019 was around 196,000 SAR total which is equivalent to 52,266 US Dollar. When the service is implemented in larger scale for all employees of a company (e.g., around 60,000) and the service runs on monthly basis, the saving will be around 1,800,00 SAR which is equivalent to 480,000 US Dollar per year (assuming 25% average reduction). Table 3 below shows the yearly cost saving assumption for bi-monthly, monthly and daily transaction run.

| Population | Number of runs | Reduction % | Service Cost | Cost Saving in SAR | Cost Saving in USD |
|---|---|---|---|---|---|
| 60000 | 6 (Bi-Monthly) | 25% | 10 SAR | 900,000 | 240,000 |
| 60000 | 12 (Monthly) | 25% | 10 SAR | 1,800,000 | 480,000 |
| 60000 | 365 (Daily) | 25% | 10 SAR | 54,750,000 | 14,600,00 |

Figure 4:
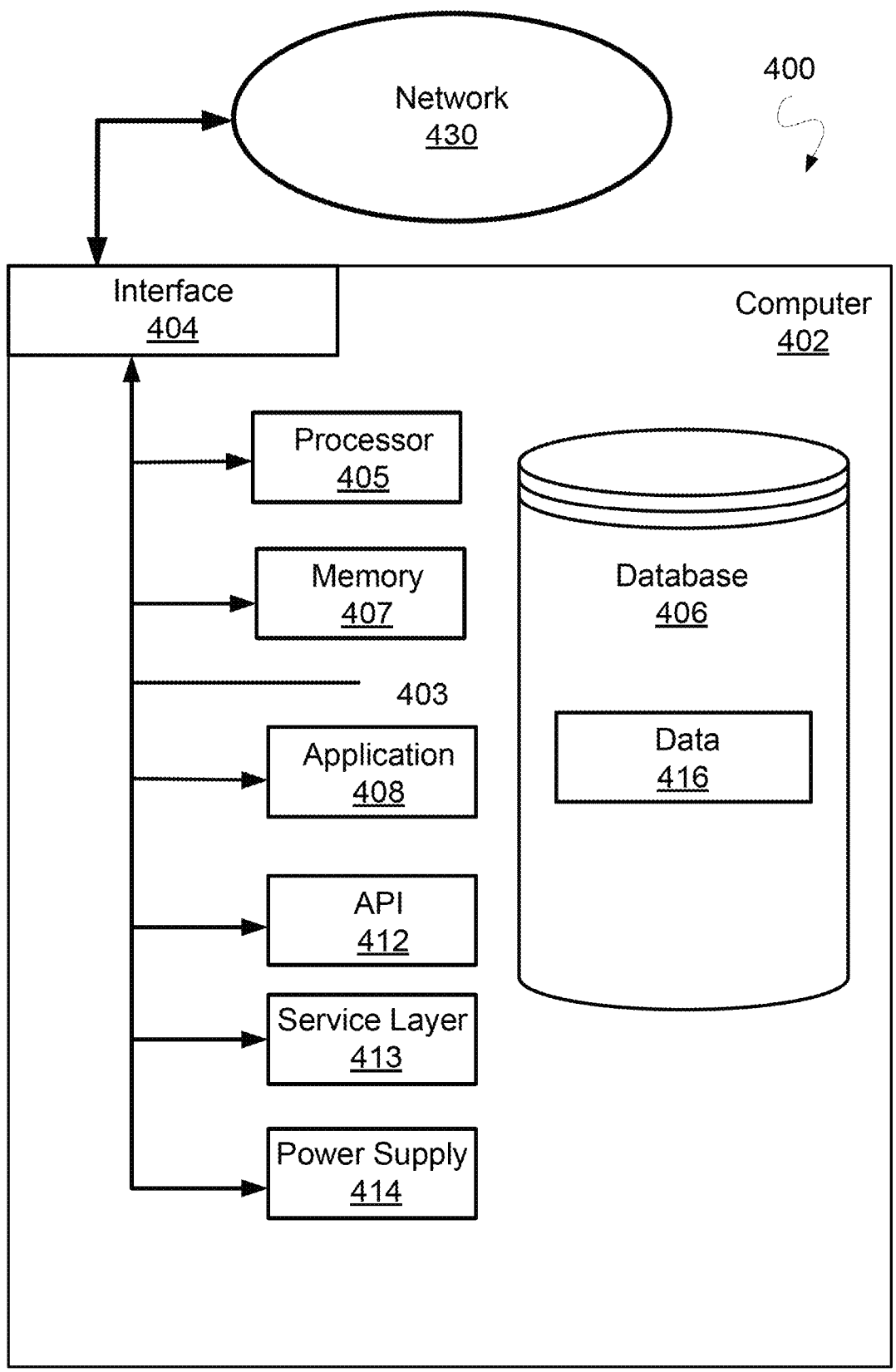
FIG. 4 is a block diagram illustrating an example of a computer system used to provide computational functionalities associated with described algorithms, methods, functions, processes, flows, and procedures, according to an implementation of the present disclosure.

FIG. 4 is a block diagram 400 illustrating an example of a computer system 400 used to provide computational functionalities associated with described algorithms, methods, functions, processes, flows, and procedures, according to an implementation of the present disclosure. The illustrated computer 402 is intended to encompass any computing device such as a server, desktop computer, laptop/ notebook computer, wireless data port, smart phone, personal data assistant (PDA), tablet computing device, one or more processors within these devices, another computing device, or a combination of computing devices, including physical or virtual instances of the computing device, or a combination of physical or virtual instances of the computing device. Additionally, the computer 402 can comprise a computing device that includes an input device, such as a keypad, keyboard, touch screen, another input device, or a combination of input devices that can accept user information, and an output device that conveys information associated with the operation of the computer 402, including digital data, visual, audio, another type of information, or a combination of types of information, on a graphical-type user interface (UI) (or GUI) or other UI.

The computer 402 can serve in a role in a computer system as a client, network component, a server, a database or another persistency, another role, or a combination of roles for performing the subject matter described in the present disclosure. The illustrated computer 402 is communicably coupled with a network 430. In some implementations, one or more components of the computer 402 can be configured to operate within an environment, including cloud-computing-based, local, global, another environment, or a combination of environments.

The computer 402 is an electronic computing device operable to receive, transmit, process, store, or manage data and information associated with the described subject matter. According to some implementations, the computer 402 can also include or be communicably coupled with a server, including an application server, e-mail server, web server, caching server, streaming data server, another server, or a combination of servers.

The computer 402 can receive requests over network 430 (for example, from a client software application executing on another computer 402) and respond to the received requests by processing the received requests using a software application or a combination of software applications. In addition, requests can also be sent to the computer 402 from internal users, external or third-parties, or other entities, individuals, systems, or computers.

Each of the components of the computer 402 can communicate using a system bus 403. In some implementations, any or all of the components of the computer 402, including hardware, software, or a combination of hardware and software, can interface over the system bus 403 using an application programming interface (API) 412, a service layer 413, or a combination of the API 412 and service layer 413. The API 412 can include specifications for routines, data structures, and object classes. The API 412 can be either computer-language independent or dependent and refer to a complete interface, a single function, or even a set of APIs. The service layer 413 provides software services to the computer 402 or other components (whether illustrated or not) that are communicably coupled to the computer 402. The functionality of the computer 402 can be accessible for all service consumers using this service layer. Software services, such as those provided by the service layer 413, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 402, alternative implementations can illustrate the API 412 or the service layer 413 as stand-alone components in relation to other components of the computer 402 or other components (whether illustrated or not) that are communicably coupled to the computer 402. Moreover, any or all parts of the API 412 or the service layer 413 can be implemented as a child or a sub-module of another software module, enterprise application, or hardware module without departing from the scope of the present disclosure.

The computer 402 includes an interface 404. Although illustrated as a single interface 404 in FIG. 4, two or more interfaces 404 can be used according to particular needs, desires, or particular implementations of the computer 402. The interface 404 is used by the computer 402 for communicating with another computing system (whether illustrated or not) that is communicatively linked to the network 430 in a distributed environment. Generally, the interface 404 is operable to communicate with the network 430 and comprises logic encoded in software, hardware, or a combination of software and hardware. More specifically, the interface 404 can comprise software supporting one or more communication protocols associated with communications such that the network 430 or interface's hardware is operable to communicate physical signals within and outside of the illustrated computer 402.

The computer 402 includes a processor 405. Although illustrated as a single processor 405 in FIG. 4, two or more processors can be used according to particular needs, desires, or particular implementations of the computer 402. Generally, the processor 405 executes instructions and manipulates data to perform the operations of the computer 402 and any algorithms, methods, functions, processes, flows, and procedures as described in the present disclosure.

The computer 402 also includes a database 406 that can hold data for the computer 402, another component communicatively linked to the network 430 (whether illustrated or not), or a combination of the computer 402 and another component. For example, database 406 can be an in-memory, conventional, or another type of database storing data consistent with the present disclosure. In some implementations, database 406 can be a combination of two or more different database types (for example, a hybrid in-memory and conventional database) according to particular needs, desires, or particular implementations of the computer 402 and the described functionality. Although illustrated as a single database 406 in FIG. 4, two or more databases of similar or differing types can be used according to particular needs, desires, or particular implementations of the computer 402 and the described functionality. While database 406 is illustrated as an integral component of the computer 402, in alternative implementations, database 406 can be external to the computer 402. As illustrated, the database 406 holds data 416 including, for example, data from service call log 201, mapping table 202, staging table 203, as explained in more detail in association with FIGS. 1-3.

The computer 402 also includes a memory 407 that can hold data for the computer 402, another component or components communicatively linked to the network 430 (whether illustrated or not), or a combination of the computer 402 and another component. Memory 407 can store any data consistent with the present disclosure. In some implementations, memory 407 can be a combination of two or more different types of memory (for example, a combination of semiconductor and magnetic storage) according to particular needs, desires, or particular implementations of the computer 402 and the described functionality. Although illustrated as a single memory 407 in FIG. 4, two or more memories 407 or similar or differing types can be used according to particular needs, desires, or particular implementations of the computer 402 and the described functionality. While memory 407 is illustrated as an integral component of the computer 402, in alternative implementations, memory 407 can be external to the computer 402.

The application 408 is an algorithmic software engine providing functionality according to particular needs, desires, or particular implementations of the computer 402, particularly with respect to functionality described in the present disclosure. For example, application 408 can serve as one or more components, modules, or applications. Further, although illustrated as a single application 408, the application 408 can be implemented as multiple applications 408 on the computer 402. In addition, although illustrated as integral to the computer 402, in alternative implementations, the application 408 can be external to the computer 402.

The computer 402 can also include a power supply 414. The power supply 414 can include a rechargeable or non-rechargeable battery that can be configured to be either user- or non-user-replaceable. In some implementations, the power supply 414 can include power-conversion or management circuits (including recharging, standby, or another power management functionality). In some implementations, the power-supply 414 can include a power plug to allow the computer 402 to be plugged into a wall socket or another power source to, for example, power the computer 402 or recharge a rechargeable battery.

There can be any number of computers 402 associated with, or external to, a computer system containing computer 402, each computer 402 communicating over network 430. Further, the term "client," "user," or other appropriate terminology can be used interchangeably, as appropriate, without departing from the scope of the present disclosure. Moreover, the present disclosure contemplates that many users can use one computer 402, or that one user can use multiple computers 402.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to a receiver apparatus for execution by a data processing apparatus. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and apparatus can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of media and memory devices, magnetic devices, magneto optical disks, and optical memory device. Memory devices include semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Magnetic devices include, for example, tape, cartridges, cassettes, internal/removable disks. Optical memory devices include, for example, digital video disc (DVD), CD-ROM, DVD+/- R, DVD-RAM, DVD-ROM, HD-DVD, and BLURAY, and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback. Input from the user can be received in any form, including acoustic, speech, or tactile input. In addition, a computer can interact with the user by sending documents to and receiving documents from a client computing device that is used by the user.

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between networks addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what can be claimed, but rather as descriptions of features that can be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method comprising:
   receiving, at a middleware server, an input stream of query requests each requesting an electronic information service provided by an external database of an external trusted party, wherein the query requests are issued by internal enterprise applications;
   establishing a service call log table that logs service calls made to the external database of the trusted party, a mapping table that records a validity period for each combination of an enterprise application and an electronic information service provided by the external database of the trusted party, and a staging table that stores, for each electronic information service, a corresponding query result retrieved from the external database of the trusted party;
   determining, by the middleware server, a first service validity period for a query request from the input stream, wherein the first service validity period is pre-determined;
   determining, by the middleware server, a gap between a current date for the query request and a corresponding past date when the query request was last successfully answered by the external database;
   in response to determining that the gap is smaller than the first service validity period, fetching a corresponding query result from the staging table on the middleware server, wherein the corresponding query result was received when the query request was last successfully answered by the external database; and in response to determining that the gap is not smaller than the first service validity period, invoking a cost control logic that determines a second service validity period, wherein the second service validity period customized for each specific query request in the input stream.

2. The computer-implemented method of claim 1, further comprising:

in response to the gap being smaller than the second service validity period, continuing to rely on the corresponding query result from the staging table on the middleware server.

3. The computer-implemented method of claim 1, further comprising:

in response to the gap being no smaller than the second service validity period, initiating a call to the external database so that the corresponding query result is fetched from the external database.

4. The computer-implemented method of claim 3, further comprising:

creating a new entry in the service call log table; and
storing a copy of the corresponding query result into the staging table at the middleware server.

5. The computer-implemented method of claim 1, wherein the external database of the trusted party provides a web service, wherein the middleware server interacts with the web service for accessing the external database, and wherein the trusted party is a government branch.

6. A middleware server comprising one or more hardware computer processors configured to perform operations of:

receiving an input stream of query requests each requesting an electronic information service provided by an external database of an external trusted party, wherein the query requests are issued by internal enterprise applications;

establishing a service call log table that logs service calls made to the external database of the trusted party, a mapping table that records a validity period for each combination of an enterprise application and an electronic information service provided by the external database of the trusted party, and a staging table that stores, for each electronic information service, a corresponding query result retrieved from the external database of the trusted party;

determining a first service validity period for a query request from the input stream, wherein the first service validity period is pre-determined;

determining a gap between a current date for the query request and a corresponding past date when the query request was last successfully answered by the external database;

in response to determining that the gap is smaller than the first service validity period, fetching a corresponding query result from a staging table on the middleware server, wherein the corresponding query result was received when the query request was last successfully answered by the external database; and in response to determining that the gap is not smaller than the first service validity period, invoking a cost control logic that determines a second service validity period, wherein the second service validity period customized for each specific query request in the input stream.

7. The middleware server of claim 6, wherein the operations further comprise:

in response to the gap being smaller than the second service validity period, continuing to rely on the corresponding query result from the staging table on the middleware server.

8. The middleware server of claim 6, wherein the operations further comprise:

in response to the gap being no smaller than the second service validity period, initiating a call to the external database so that the corresponding query result is fetched from the external database.

9. The middleware server of claim 8, wherein the operations further comprise:

creating a new entry in the service call log table; and
storing a copy of the corresponding query result into the staging table at the middleware server.

10. The middleware server of claim 6, wherein the external database of the trusted party provides a web service, wherein the middleware server interacts with the web service for accessing the external database, and wherein the trusted party is a government branch.

11. A non-transitory computer-readable medium comprising software instructions that, when executed, cause a computer processor to perform operations of:

receiving an input stream of query requests each requesting an electronic information service provided by an external database of an external trusted party, wherein the query requests are issued by internal enterprise applications;

establishing a service call log table that logs service calls made to the external database of the trusted party, a mapping table that records a validity period for each combination of an enterprise application and an electronic information service provided by the external database of the trusted party, and a staging table that stores, for each electronic information service, a corresponding query result retrieved from the external database of the trusted party;

determining a first service validity period for a query request from the input stream, wherein the first service validity period is pre-determined;

determining a gap between a current date for the query request and a corresponding past date when the query request was last successfully answered by the external database;

in response to determining that the gap is smaller than the first service validity period, fetching a corresponding query result from a staging table on a middleware server that includes the computer processor, wherein the corresponding query result was received when the query request was last successfully answered by the external database; and in response to determining that the gap is not smaller than the first service validity period, invoking a cost control logic that determines a second service validity period, wherein the second service validity period customized for each specific query request in the input stream.

12. The non-transitory computer-readable medium of claim 11, wherein the operations further comprise:

in response to the gap being smaller than the second service validity period, continuing to rely on the corresponding query result from the staging table on the middleware server.

13. The non-transitory computer-readable medium claim 11, wherein the operations further comprise:

in response to the gap being no smaller than the second service validity period, initiating a call to the external database so that the corresponding query result is fetched from the external database.

14. The non-transitory computer-readable medium of claim 12, wherein the operations further comprise:
creating a new entry in the service call log table; and
storing a copy of the corresponding query result into the staging table at the middleware server.

* * * * *